US007564915B2

United States Patent
Lee et al.

(10) Patent No.: US 7,564,915 B2
(45) Date of Patent: Jul. 21, 2009

(54) APPARATUS AND METHOD FOR CODING/DECODING PSEUDO ORTHOGONAL SPACE-TIME BLOCK CODE IN A MOBILE COMMUNICATION SYSTEM USING MULTIPLE INPUT MULTIPLE OUTPUT SCHEME

(75) Inventors: In-Kyu Lee, Seoul (KR); Heun-Chul Lee, Seoul (KR)

(73) Assignees: Samsung Electronics Co., Ltd. (KR); Seoul National University Industry Foundation (KR)

( * ) Notice: Subject to any disclaimer, the term of this patent is extended or adjusted under 35 U.S.C. 154(b) by 638 days.

(21) Appl. No.: 11/153,201

(22) Filed: Jun. 15, 2005

(65) Prior Publication Data

US 2005/0281322 A1 Dec. 22, 2005

(30) Foreign Application Priority Data

Jun. 16, 2004 (KR) .............. 10-2004-0044721
Apr. 12, 2005 (KR) .............. 10-2005-0030526

(51) Int. Cl.
*H04B 1/00* (2006.01)
(52) U.S. Cl. .................... 375/267; 375/269; 375/347
(58) Field of Classification Search ............... 375/267, 375/146–148, 340, 347, 262, 316, 341
See application file for complete search history.

(56) References Cited

U.S. PATENT DOCUMENTS 6,088,408 A * 7/2000 Calderbank et al. ......... 375/347

| 6,594,473 | B1 * | 7/2003 | Dabak et al. | 455/101 |
|---|---|---|---|---|
| 7,317,750 | B2 * | 1/2008 | Shattil | 375/146 |
| 2002/0196842 | A1 * | 12/2002 | Onggosanusi et al. | 375/148 |
| 2003/0021355 | A1 * | 1/2003 | You | 375/267 |
| 2004/0086027 | A1 * | 5/2004 | Shattil | 375/146 |
| 2007/0211786 | A1 * | 9/2007 | Shattil | 375/141 |

OTHER PUBLICATIONS

Alamouti, A Simple Transmit Diversity Technique for Wireless Communications, IEEE Journal on Select Areas in Communications, vol. 16, No. 8, Oct. 1998, pp. 1451-1458.
Tarokh et al., Space-Time Block Codes from Orthogonal Designs, IEEE Transactions on Information Theory, vol. 45, No. 5, Jul. 1999, pp. 1456-1467.
Dalton et al., "A Full-Rate, Full-Diversity Four-Antenna Quasi-Orthogonal Space-Time Block Code", IEEE Transactions on Wireless Communications, vol. 4, No. 2, Mar. 2005.

* cited by examiner

*Primary Examiner*—Chieh M Fan
*Assistant Examiner*—Qutbuddin Ghulamali
(74) *Attorney, Agent, or Firm*—The Farrell Law Firm, LLP (57) ABSTRACT

An apparatus for coding a pseudo orthogonal space-time block code in a transmitter using 4 transmission antennas of first to fourth transmission antennas. Upon receiving information symbol streams $x_1 x_2 x_3 x_4$ to be transmitted, a serial-to-parallel converter parallel-converts the received information symbol streams $x_1 x_2 x_3 x_4$ into $x_1, x_2, x_3, x_4$. A pseudo orthogonal space-time block coding (PO-STBC) encoder codes the parallel-converted information symbol streams $x_1, x_2, x_3, x_4$ using a pseudo orthogonal space-time block coding scheme such that the information symbol streams $x_1, x_2, x_3, x_4$ are transmitted via corresponding transmission antennas for first to fourth time periods.

6 Claims, 5 Drawing Sheets

APPARATUS AND METHOD FOR CODING/DECODING PSEUDO ORTHOGONAL SPACE-TIME BLOCK CODE IN A MOBILE COMMUNICATION SYSTEM USING MULTIPLE INPUT MULTIPLE OUTPUT SCHEME

PRIORITY

This application claims priority under 35 U.S.C. § 119 to an application entitled "Apparatus and Method for Coding/Decoding Pseudo Orthogonal Space-Time Block Code in a Mobile Communication System Using Multiple Input Multiple Output Scheme" filed in the Korean Intellectual Property Office on Jun. 16, 2004 and assigned Serial No. 2004-44721, and an application entitled "Apparatus and Method for Coding/Decoding Pseudo Orthogonal Space-Time Block Code in a Mobile Communication System Using Multiple Input Multiple Output Scheme" filed in the Korean Intellectual Property Office on Apr. 12, 2005 and assigned Serial No. 2005-30526, the contents of both of which are incorporated herein by reference.

BACKGROUND OF THE INVENTION

1. Field of the Invention

The present invention relates generally to an apparatus and method for coding/decoding in a mobile communication system using a Multiple Input Multiple Output (MIMO) scheme (hereinafter referred to as a "MIMO mobile communication system"), and in particular, to an apparatus and method for coding/decoding pseudo orthogonal space-time block codes that maximize a coding gain and a data rate.

2. Description of the Related Art

In communication systems, the most fundamental issue is how efficiently and reliably the communication system can transmit data over a channel. As the next generation multimedia mobile communication system, into which extensive research is being conducted, requires a high-speed communication system capable of processing and transmitting a variety of information such as image and radio data surpassing the early voice-oriented services, it is essential to increase system efficiency using a channel coding scheme suitable for the system.

However, the wireless channel environment prepared in the mobile communication system, unlike the wire channel environment, is subject to inevitable errors due to several causes such as multipath interference, shadowing, propagation attenuation, time-varying noise, interference, fading, etc., each causing a loss of information.

The information loss distorts the actual transmission signals, causing deterioration in the overall performance of the mobile communication system. Generally, in order to reduce the information loss, various error control techniques are used to increase system reliability. The most basic one of the error control techniques is a technique using error correcting codes.

Further, in order to prevent the instability of communication due to fading, diversity schemes are used, and the diversity schemes are roughly classified into a time diversity scheme, a frequency diversity scheme, and an antenna diversity scheme, i.e. a space diversity scheme.

The antenna diversity scheme, which is a scheme using multiple antennas, is classified into a receive antenna diversity scheme using a plurality of reception antennas, a transmit antenna diversity scheme using a plurality of transmission antennas, and a MIMO scheme using a plurality of reception antennas and a plurality of transmission antennas.

The MIMO scheme is a Space-Time Coding (STC) scheme, and the space-time coding scheme extends a time-domain coding scheme to a space-domain coding scheme by transmitting signals coded with a coding scheme using a plurality of transmission antennas, thereby achieving a lower error rate. The space-time coding scheme has been developed on the assumption that a radio channel between a transmitter and a receiver is a flat fading channel.

As a Space-Time Block Coding (STBC) scheme, which is one of the schemes that utilizes the antenna diversity scheme, i.e. a transmit antenna diversity scheme or a space-time block coding scheme, proposed by S. M. Alamouti (cf. S. M. Alamouti, 'A simple transmitter diversity scheme for wireless communications', IEEE Journal on Selected Area in Communications, Vol. 16, pp. 1451-1458, October 1998), and a space-time block coding scheme proposed by Vahid Tarokh (cf. Vahid Tarokh, 'Space-time block coding from orthogonal designs', IEEE Trans. on Info., Theory, Vol. 45, pp. 1456-1467, July 1999). For convenience, hereinafter, the space-time block coding scheme proposed by S. M. Alamouti will be referred to as an "Alamouti space-time block coding scheme" and the space-time block coding scheme proposed by Tarokh will be referred to as a "Tarokh space-time block coding scheme."

The Alamouti space-time block coding scheme is a space-time block coding scheme in which a transmitter uses 2 transmission antennas, and the Tarokh space-time block coding scheme indicates a space-time block coding scheme modified by extending the Alamouti space-time block coding scheme such that it can be applied to a transmitter that uses more than 2 transmission antennas. Because the performance gain acquired when the space-time block coding scheme is combined with the MIMO scheme is well known, a description thereof will be omitted herein.

Active research into a $4^{th}$ generation (4G) communication system which is the next generation communication system is being conducted to provide to users services with various Quality-of-Service (QoS) levels at a high data rate. Currently, in the 4G communication system, research is being conducted on technology for supporting high-speed services in such a way that mobility and QoS are guaranteed in a Broadband Wireless Access (BWA) communication system such as a wireless Local Area Network (LAN) system and a wireless Metropolitan Area Network (MAN) system.

In the 4G communication system, active research is being conducted in an Orthogonal Frequency Division Multiplexing (OFDM) scheme as a scheme useful for high-speed data transmission in wire/wireless channels. The OFDM scheme, a scheme for transmitting data using multiple carriers, is a type of a Multi Carrier Modulation (MCM) scheme that converts a serial input symbol stream into parallel symbols and modulates the parallel symbols with multiple orthogonal subcarriers before transmission.

The 4G communication system needs broadband spectrum resources in order to provide high-speed, high-quality wireless multimedia services. However, when the broadband spectrum resources are used, a fading effect in a radio transmission path due to multipath propagation is considerable, and a frequency selective fading effect occurs even in a transmission band. Therefore, for the high-speed wireless multimedia services, the OFDM scheme, which is robust against the frequency selective fading, is higher in gain than a Code Division Multiple Access (CDMA) scheme. Thus, the 4G communication system has a tendency to chiefly use the OFDM scheme.

As described above, the wireless channel environment provided in the mobile communication system, unlike the wire channel environment, experiences information losses caused by inter-symbol interference (ISI) and frequency selective fading due to multipath interference, shadowing, propagation attenuation, time-varying noise, delay spread, etc. Unavoidable errors occur due to the information losses, causing a loss of information data. The loss of information data considerably distorts the actual transmission signals, causing deterioration in the overall performance of the mobile communication system.

A mobile communication system using the OFDM scheme (hereinafter referred to as an "OFDM mobile communication system") not only uses the multiple orthogonal subcarriers but also inserts guard intervals in transmitting the OFDM symbols in order to cope with the inter-symbol interference and the frequency selective fading. The guard intervals are inserted using one of the following two schemes: a cyclic prefix scheme of copying a predetermined number of last samples of a time-domain OFDM symbol and inserting the copied samples into an effective OFDM symbol, and a cyclic postfix scheme of copying a predetermined number of first samples of a time-domain OFDM symbol and inserting the copied samples into an effective OFDM symbol. As a result, the OFDM mobile communication system uniformly distributes the frequency selective fading effect to the multiple subcarriers so that a receiver can receive signals even though it has a single-tap equalizer for each of the subcarriers.

The space-time coding scheme faces a tradeoff between the following 3 aims of (1) maximizing error performance, i.e. maximizing a diversity order and a coding gain, (2) maximizing a coding rate, and (3) minimizing decoding complexity. That is, there is no space-time coding scheme that satisfies all of the 3 aims, and when one of the 3 aims is satisfied, other aim(s) is/are sacrificed.

For example, in the flat fading channel, it is most important to optimize the diversity order using the space-time coding scheme. On the contrary, in a frequency selective fading channel for which the frequency diversity is useful, it is less important to maximize the diversity order, i.e. acquire the full diversity gain, using the space-time coding scheme. This is because in the frequency selective fading channel, it is possible to maximize a diversity gain using the OFDM scheme as described above.

Accordingly, there is a demand for a new space-time block coding scheme for maximizing a data rate and a coding gain while securing a full diversity gain in the MIMO mobile communication system.

SUMMARY OF THE INVENTION

It is, therefore, an object of the present invention to provide an apparatus and method for coding/decoding space-time block codes that maximize a coding gain and a data rate in a MIMO mobile communication system.

It is another object of the present invention to provide an apparatus and method for coding/decoding space-time block codes that minimize decoding calculation and complexity in a MIMO mobile communication system.

According to one aspect of the present invention, there is provided an apparatus for coding a pseudo orthogonal space-time block code in a transmitter using a plurality of transmission antennas. The apparatus includes a serial-to-parallel converter for, upon receiving information symbol streams to be transmitted, parallel-converting the received information symbol streams according to the number of the transmission antennas; and a pseudo orthogonal space-time block coding (PO-STBC) encoder for coding the parallel-converted information symbol streams using a pseudo orthogonal space-time block coding scheme such that the information symbol streams are transmitted via the transmission antennas for predetermined periods of time.

According to another aspect of the present invention, there is provided an apparatus for coding a pseudo orthogonal space-time block code in a transmitter using 4 transmission antennas. The apparatus includes a serial-to-parallel converter for, upon receiving information symbol streams $x_1x_2x_3x_4$ to be transmitted, parallel-converting the received information symbol streams $x_1x_2x_3x_4$ into $x_1,x_2,x_3,x_4$; and a pseudo orthogonal space-time block coding (PO-STBC) encoder for coding the parallel-converted information symbol streams $x_1,x_2,x_3,x_4$ using a pseudo orthogonal space-time block coding scheme such that the information symbol streams $x_1,x_2,x_3,x_4$ are transmitted via corresponding transmission antennas for first to fourth periods of time.

According to further another aspect of the present invention, there is provided an apparatus for coding a pseudo orthogonal space-time block code in a transmitter using 4 transmission antennas. The apparatus includes a serial-to-parallel converter for, upon receiving information symbol streams $x_1x_2x_3x_4$ to be transmitted, parallel-converting the received information symbol streams $x_1x_2x_3x_4$ into $\tilde{x}_1,\tilde{x}_2,\tilde{x}_3,\tilde{x}_4$; and a pseudo orthogonal space-time block coding (PO-STBC) encoder for coding the parallel-converted information symbol streams $\tilde{x}_1,\tilde{x}_2,\tilde{x}_3,\tilde{x}_4$ using a pseudo orthogonal space-time block coding scheme such that the information symbol streams $\tilde{x}_1,\tilde{x}_2,\tilde{x}_3,\tilde{x}_4$ are transmitted via corresponding transmission antennas for first to fourth periods of time.

According to yet another aspect of the present invention, there is provided an apparatus for decoding in a receiver a pseudo orthogonal space-time block code that a transmitter transmits via a plurality of transmission antennas. The apparatus includes a channel estimator for, upon receiving a signal, generating a channel response matrix by channel-estimating the received signal; and a detector for decoding the pseudo orthogonal space-time block code transmitted from the transmitter into information symbol streams depending on the channel response matrix.

According to still another aspect of the present invention, there is provided a method for coding a pseudo orthogonal space-time block code in a transmitter using a plurality of transmission antennas. The method includes the steps of, upon receiving information symbol streams to be transmitted, parallel-converting the received information symbol streams according to the number of the transmission antennas; and coding the parallel-converted information symbol streams using a pseudo orthogonal space-time block coding scheme such that the information symbol streams are transmitted via the transmission antennas for predetermined periods of time.

According to still another aspect of the present invention, there is provided a method for coding a pseudo orthogonal space-time block code in a transmitter using 4 transmission antennas. The method includes the steps of, upon receiving information symbol streams $x_1x_2x_3x_4$ to be transmitted, parallel-converting the received information symbol streams $x_1x_2x_3x_4$ into $x_1,x_2,x_3,x_4$; and coding the parallel-converted information symbol streams $x_1,x_2,x_3,x_4$ using a pseudo orthogonal space-time block coding scheme such that the information symbol streams $x_1,x_2,x_3,x_4$ are transmitted via corresponding transmission antennas for first to fourth periods of time.

According to still another aspect of the present invention, there is provided a method for coding a pseudo orthogonal space-time block code in a transmitter using 4 transmission antennas. The method includes the steps of, upon receiving information symbol streams $x_1x_2x_3x_4$ to be transmitted, parallel-converting the received information symbol streams $x_1x_2x_3x_4$ into $\tilde{x}_1,\tilde{x}_2,\tilde{x}_3,\tilde{x}_4$; and coding the parallel-converted information symbol streams $\tilde{x}_1,\tilde{x}_2,\tilde{x}_3,\tilde{x}_4$ using a pseudo orthogonal space-time block coding scheme such that the information symbol streams $\tilde{x}_1,\tilde{x}_2,\tilde{x}_3,\tilde{x}_4$ are transmitted via corresponding transmission antennas for first to fourth periods of time.

According to still another aspect of the present invention, there is provided a method for decoding in a receiver a pseudo orthogonal space-time block code that a transmitter transmits via a plurality of transmission antennas. The method includes the steps of, upon receiving a signal, generating a channel response matrix by channel-estimating the received signal; and decoding the pseudo orthogonal space-time block code transmitted from the transmitter into information symbol streams depending on the channel response matrix.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Preferred embodiments of the present invention will now be described in detail with reference to the annexed drawings. In the following description, a detailed description of known functions and configurations incorporated herein has been omitted for conciseness.

The present invention proposes a pseudo orthogonal Space-Time Block Coding (STBC) scheme that maximizes a data rate and a coding gain in a mobile communication system using a Multiple Input Multiple Output (MIMO) scheme (hereinafter referred to as a "MIMO mobile communication system"). In particular, the present invention proposes a pseudo orthogonal space-time block coding scheme that maximizes a data rate and a coding gain while securing a full diversity gain, and the pseudo orthogonal space-time block coding scheme is maximized in a frequency selective fading channel.

Figure 1:
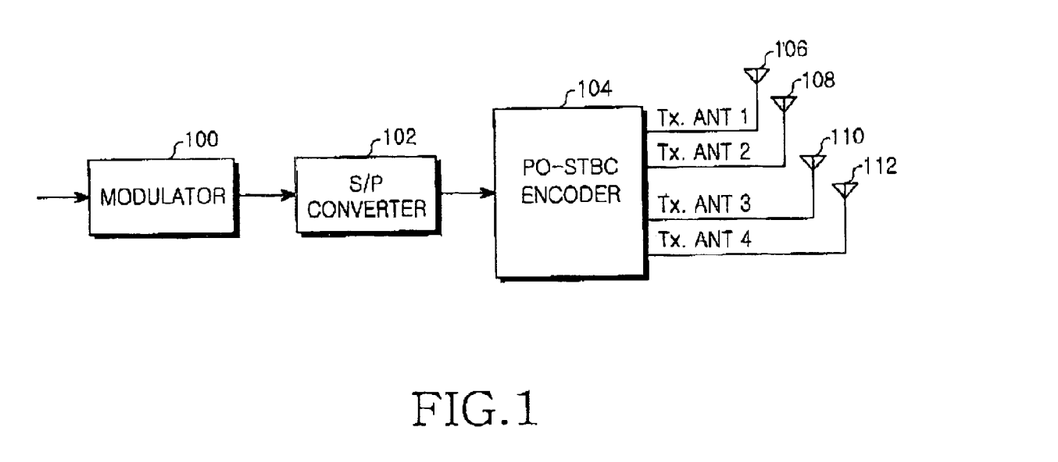
FIG. 1 is a diagram illustrating a structure of a transmitter in a MIMO mobile communication system according to an embodiment of the present invention.

FIG. 1 is a diagram illustrating a structure of a transmitter in a MIMO mobile communication system according to an embodiment of the present invention.

Before a description of FIG. 1 is given, a transmit antenna diversity scheme proposed by S. M. Alamouti (cf. S. M. Alamouti, 'A Simple Transmitter Diversity Scheme For Wireless Communications', IEEE Journal on Selected Area in Communications, Vol. 16, pp. 1451-1458, October 1998) will be described. For convenience, the transmit antenna diversity scheme proposed by S. M. Alamouti will be referred to as an "Alamouti transmit antenna diversity scheme."

It will be herein assumed that the Alamouti transmit antenna diversity scheme indicates a transmit antenna diversity scheme applied when a transmitter of the MIMO mobile communication system uses two transmission antennas, and serial modulation symbols input to the transmitter are represented by $x_i, x_j$. The serial modulation symbols $x_i, x_j$ are STBC-coded by the Alamouti transmit antenna diversity scheme as shown in Equation (1) below.

$$X_{ij} = \begin{bmatrix} x_i & x_j \\ -x_j^* & x_i^* \end{bmatrix} \quad (1)$$

The 2×2 matrix $X_{ij}$ shown in Equation (1) indicates a coding matrix based on the Alamouti transmit antenna diversity scheme, in which * denotes complex conjugate calculation. For convenience, the coding matrix based on the Alamouti transmit antenna diversity scheme, i.e. the 2×2 matrix shown in Equation (1), will be referred to as an "Alamouti matrix."

The Alamouti matrix is a coding matrix for modulation symbols transmitted via the two transmission antennas. In the Alamouti matrix, elements in each row are mapped to the 2 transmission antennas, respectively, and elements in each column are mapped to signals transmitted via the 2 transmission antennas in a corresponding time period.

In a first time period $t_1$, $x_i$ is transmitted via a first transmission antenna Tx.ANT1 and $x_j$ is transmitted via a second transmission antenna Tx.ANT2, and in a second time period $t_1+1$, $-x_j^*$ is transmitted via the first transmission antenna Tx.ANT1 and $x_i^*$ is transmitted via the second transmission antenna Tx.ANT2.

The present invention proposes a new space-time block coding scheme that takes onto consideration the characteristics of the Alamouti matrix based on the Alamouti transmit antenna diversity scheme and a general 2×2 Hadamard matrix. The new space-time block coding scheme proposed in the present invention will be referred to as a "pseudo orthogonal (PO) space-time block coding scheme." A coding matrix based on the pseudo orthogonal space-time block coding scheme proposed in the present invention can be expressed as $$C = \begin{vmatrix} X_{12} & X_{34} \\ -X_{12} & X_{34} \end{vmatrix} \quad (2)$$

$$= \begin{vmatrix} x_1 & x_2 & x_3 & x_4 \\ -x_2^* & x_1^* & -x_4^* & x_3^* \\ -x_1 & -x_2 & x_3 & x_4 \\ x_2^* & -x_1^* & -x_4^* & x_3^* \end{vmatrix}$$

In Equation (2), an $(i,j)^{th}$ element indicates a symbol transmitted via a $j^{th}$ antenna in an $i^{th}$ symbol period. In the given matrix, because 4 symbols are transmitted for 4 symbol periods, its antenna rate becomes 1. The pseudo orthogonal space-time block coding scheme generates elements of the coding matrix as according to $$x_i = Re\{s_i\} + Im\{s_{(i+2)mod 4}\} \quad i=0,1,2,3 \qquad (3)$$

In Equation (3), $s_i$ denotes symbols for an original signal point, and $x_i$ denotes symbols generated by a space-time diversity scheme. That is, the space-time diversity scheme obtains a diversity gain by shuffling in-phase components and quadrature-phase components for a signal point, so that each component experiences a different channel and a noise with a different variance value.

The coding matrix based on the pseudo orthogonal space-time block coding scheme, shown in Equation (2), can be extended to $$\tilde{C} = \begin{vmatrix} \tilde{x}_1 & \tilde{x}_2 & \tilde{x}_3 & \tilde{x}_4 \\ -\tilde{x}_2^* & \tilde{x}_1^* & -\tilde{x}_4^* & \tilde{x}_3^* \\ -\tilde{x}_1 & -\tilde{x}_2 & \tilde{x}_3 & \tilde{x}_4 \\ \tilde{x}_2^* & -\tilde{x}_1^* & -\tilde{x}_4^* & \tilde{x}_3^* \end{vmatrix} \qquad (4)$$

In Equation (2), C denotes the coding matrix based on the pseudo orthogonal space-time block coding scheme, and in Equation (4), $\tilde{C}$ denotes an extended form of the coding matrix based on the pseudo orthogonal space-time block coding scheme of Equation (2). The pseudo orthogonal space-time block coding schemes shown in both Equation (2) and Equation (4) will be referred to as a "pseudo orthogonal coding matrix." The pseudo orthogonal space-time block coding scheme is a space-time block coding scheme applied when the transmitter uses 4 transmission antennas. As shown in Equation (2) and Equation (3), the pseudo orthogonal coding matrix has a mixed characteristics of the Alamouti matrix and the 2×2 Hadamard matrix.

In the pseudo orthogonal coding matrix, elements in each row are mapped to the transmission antennas, and elements in each column are mapped to signals transmitted via the transmission antennas in a corresponding time period.

Assuming in Equation (2) that input serial modulation symbols are represented by $x_1 x_2 x_3 x_4$, in a first time period $t_1$, $x_1$ is transmitted via a first transmission antenna Tx.ANT1, $x_2$ is transmitted via a second transmission antenna Tx.ANT2, $x_3$ is transmitted via a third transmission antenna Tx.ANT3 and $x_4$ is transmitted via a fourth transmission antenna Tx.ANT4. In a second time period $t_2$, $-x_2^*$ is transmitted via the first transmission antenna Tx.ANT1, $x_1^*$ is transmitted via the second transmission antenna Tx.ANT2, $-x_4^*$ is transmitted via the third transmission antenna Tx.ANT3 and $x_3^*$ is transmitted via the fourth transmission antenna Tx.ANT4. In a third time period $t_3$, $-x_1$ is transmitted via the first transmission antenna Tx.ANT1, $-x_2$ is transmitted via the second transmission antenna Tx.ANT2, $x_3$ is transmitted via the third transmission antenna Tx.ANT3 and $x_4$ is transmitted via the fourth transmission antenna Tx.ANT4. In a fourth time period $t_4$, $x_2^*$ is transmitted via the first transmission antenna Tx.ANT1, $-x_1^*$ is transmitted via the second transmission antenna Tx.ANT2, $-x_4^*$ is transmitted via the third transmission antenna Tx.ANT3 and $x_3^*$ is transmitted via the fourth transmission antenna Tx.ANT4.

Next, assuming in Equation (4) that input serial modulation symbols are represented by $x_1 x_2 x_3 x_4$, in a first time period $t_1$, $\tilde{x}_1$ is transmitted via a first transmission antenna Tx.ANT1, $\tilde{x}_2$ is transmitted via a second transmission antenna Tx.ANT2, $\tilde{x}_3$ is transmitted via a third transmission antenna Tx.ANT3 and $\tilde{x}_4$ is transmitted via a fourth transmission antenna Tx.ANT4. In a second time period $t_2$, $-\tilde{x}_2^*$ is transmitted via the first transmission antenna Tx.ANT1, $\tilde{x}_1^*$ is transmitted via the second transmission antenna Tx.ANT2, $-\tilde{x}_4^*$ is transmitted via the third transmission antenna Tx.ANT3 and $\tilde{x}_3^*$ is transmitted via the fourth transmission antenna Tx.ANT4. In a third time period $t_3$, $-\tilde{x}_1$ is transmitted via the first transmission antenna Tx.ANT1, $-\tilde{x}_2$ is transmitted via the second transmission antenna Tx.ANT2, $\tilde{x}_3$ is transmitted via the third transmission antenna Tx.ANT3 and $\tilde{x}_4$ is transmitted via the fourth transmission antenna Tx.ANT4. In a fourth time period $t_4$, $\tilde{x}_2^*$ is transmitted via the first transmission antenna Tx.ANT1, $-\tilde{x}_1^*$ is transmitted via the second transmission antenna Tx.ANT2, $-\tilde{x}_4^*$ is transmitted via the third transmission antenna Tx.ANT3 and $\tilde{x}_3^*$ is transmitted via the fourth transmission antenna Tx.ANT4.

As described with reference to Equation (2) and Equation (4), the pseudo orthogonal coding matrix has a full data rate. A description of a definition of complex orthogonal in the space-time block coding scheme proposed by Vahid Tarokh (cf. Vahid Tarokh, 'Space-Time Block Coding From Orthogonal Designs', IEEE Trans. on Info., Theory, Vol. 45, pp. 1456-1467, July 1999) will be made below. A description of the invention will be made with reference to the pseudo orthogonal coding matrix C of Equation (2), and the space-time block coding scheme proposed by Vahid Tarokh will be referred to as a "Tarokh space-time block coding scheme."

Before a description of the definition of complex orthogonal in the Tarokh space-time block coding scheme is given, the pseudo orthogonal coding matrix will be described below.

(1) A pseudo orthogonal design in parameters $x_1, x_2, \ldots, x_n$ is an n×n coding matrix C, and the n×n coding matrix C has the following characteristics.

(i) Constituent elements of the n×n coding matrix C can be expressed as $$C = \pm x_1, \pm x_1^*, \pm x_2, \pm x_2^*, \ldots, \pm x_n, \pm x_n^* \qquad (5)$$

(ii) A relationship between the n×n coding matrix C and a matrix $C^+$ determined by performing complex conjugate and transpose calculations on the n×n coding matrix C is given as $$C^+ C = D \qquad (6)$$

In Equation (6), D denotes an i×i diagonal matrix having a form of $l_1^i |x_1|^2 + l_2^i |x_2|^2 + \ldots + l_n^i |x_n|^2$, and $^+$ denotes complex conjugate and transpose calculations. Non-negative coefficients $l_1^i, l_2^i, \ldots, l_n^i$, i.e. positive coefficients, can be expressed as $$l_1^i + l_2^i + \ldots + l_n^i = n \qquad (7)$$

In contrast to the orthogonal definition in the Tarokh space-time block coding scheme, the pseudo orthogonal space-time block coding scheme includes 0-coefficents $l_j^i$ in order that the diagonal matrix D should not be larger than an identity matrix in size. Therefore, the pseudo orthogonal coding matrix C of Equation (2) satisfies a pseudo orthogonal code design condition of Equation (8) below.

$$C^+ C = \begin{bmatrix} d_1 & 0 & 0 & 0 \\ 0 & d_1 & 0 & 0 \\ 0 & 0 & d_2 & 0 \\ 0 & 0 & 0 & d_2 \end{bmatrix} \qquad (8)$$

In Equation (8), $d_1=2(|x_1|^2+|x_2|^2)$ and $d_2=2(|x_3|^2+|x_4|^2)$. A minimum rank of the pseudo orthogonal coding matrix $C(x_{c1}-x_{e1},x_{c2}-x_{e2},x_{c3}-x_{e3},x_{c4}-x_{e4})$ is 2.

Referring back now to FIG. 1, the transmitter includes a modulator 100, a serial-to-parallel (S/P) converter 102, a pseudo orthogonal space-time block coding (PO-STBC) encoder 104, and 4 transmission antennas (106, 108, 110 and 112) of a first transmission antenna 106 to a fourth transmission antenna 112.

Upon receiving input information data bits, the modulator 100 modulates the input information data bits into modulation symbols using a predetermined modulation scheme, and outputs the modulation symbols to the S/P converter 102. Any one of a Binary Phase Shift Keying (BPSK) scheme, a Quadrature Phase Shift Keying (QPSK) scheme, a Quadrature Amplitude Modulation (QAM) scheme, a Pulse Amplitude Modulation (PAM) scheme, a Phase Shift Keying (PSK) scheme can used as the modulation scheme.

The S/P converter 102 converts the serial modulation symbols output from the modulator 100 into parallel modulation symbols and outputs the parallel modulation symbols to the PO-STBC encoder 104. It will be assumed herein that the serial modulation symbols are represented by $x_1x_2x_3x_4$. The PO-STBC encoder 104 performs pseudo orthogonal space-time block coding on the 4 modulation symbols $x_1x_2x_3x_4$ output from the S/P converter 102, and outputs modulation symbols described with reference to Equation (2) or Equation (4).

For example, in the case of Equation (2), in a first time period $t_1$, $x_1$ is transmitted via a first transmission antenna 106, $x_2$ is transmitted via a second transmission antenna 108, $x_3$ is transmitted via a third transmission antenna 110 and $x_4$ is transmitted via a fourth transmission antenna 112. In a second time period $t_2$, $-x_2^*$ is transmitted via the first transmission antenna 106, $x_1^*$ is transmitted via the second transmission antenna 108, $-x_4^*$ is transmitted via the third transmission antenna 110 and $x_3^*$ is transmitted via the fourth transmission antenna 112. In a third time period $t_3$, $-x_1$ is transmitted via the first transmission antenna 106, $-x_2$ is transmitted via the second transmission antenna 108, $x_3$ is transmitted via the third transmission antenna 110 and $x_4$ is transmitted via the fourth transmission antenna 112. In a fourth time period $t_4$, $x_2^*$ is transmitted via the first transmission antenna 106, $-x_1^*$ is transmitted via the second transmission antenna 108, $-x_4^*$ is transmitted via the third transmission antenna 110 and $x_3^*$ is transmitted via the fourth transmission antenna 112. As the symbols transmitted via the 4 transmission antennas are orthogonal with each other, a diversity gain corresponding to the diversity order can be obtained.

Figure 2:
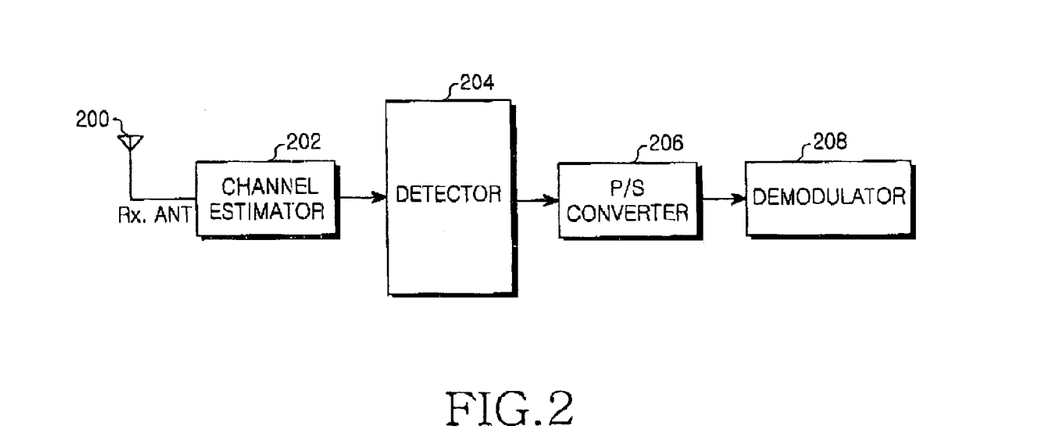
FIG. 2 is a diagram illustrating a structure of a receiver in a MIMO mobile communication system corresponding to the structure of the transmitter in the MIMO mobile communication system of FIG. 1.

FIG. 2 is a diagram illustrating a structure of a receiver in a MIMO mobile communication system corresponding to the structure of the transmitter in the MIMO mobile communication system described with reference to FIG. 1. However, before a description of FIG. 2 is given, it will be assumed that the receiver uses one reception antenna Rx.ANT.

Referring to FIG. 2, the receiver includes a reception antenna 200, a channel estimator 202, a detector 204, a parallel-to-serial (P/S) converter 206, and a demodulator 208. Although the number of reception antennas in the receiver is different herein from the number of transmission antennas in the transmitter, the number of reception antennas in the receiver can also be equal to the number of transmission antennas in the transmitter.

Signals transmitted via the 4 transmission antennas of the transmitter described with reference to FIG. 1 are received at the receiver via the reception antenna 200. The reception antenna 200 outputs the received signal to the channel estimator 202. Assuming that the signal received via the reception antenna 200 is represented by 'r', the reception signal 'r' can be expressed as Equation (9) and Equation (10), which are associated with Equation (2) and Equation (4), respectively. It is assumed herein that the channels are non-time-varying channels, which are constant for a given 4-symbol period, and the channels are independent of each other.

$$r = \begin{bmatrix} r_1 \\ r_2 \\ r_3 \\ r_4 \end{bmatrix} = C \begin{bmatrix} h_1 \\ h_2 \\ h_3 \\ h_4 \end{bmatrix} + n \tag{9}$$

$$r = \begin{bmatrix} r_1 \\ r_2 \\ r_3 \\ r_4 \end{bmatrix} = \tilde{S} \begin{bmatrix} h_1 \\ h_2 \\ h_3 \\ h_4 \end{bmatrix} + n \tag{10}$$

In Equation (9) and Equation (10), 'n' denotes a noise component in the case where a complex Gaussian variance is $\sigma_n^2=1$, and $h_i$ for $h_1, h_2, h_3$ and $h_4$ denotes a path gain for a path that a signal transmitted via an $i^{th}$ transmission antenna experiences. The path gain can be modeled as independent complex Gaussian random parameters having a variance of 0.5 per dimension, and it is assumed that the path gain is obtained in, for example, a Rayleigh fading environment.

If complex conjugate calculation is performed on a $2^{nd}$ element and a $4^{th}$ element of the reception signal 'r' described with reference to Equation (9) and Equation (10), the results are $$\tilde{r}=Hx+\tilde{n} \tag{11}$$

$$\tilde{r}=H\tilde{s}+\tilde{n} \tag{12}$$

In Equation (11) and Equation (12), $\tilde{n}=[n_1 n_2^* n_3 n_4^*]^T$, $x=[x_1 x_2 x_3 x_4]^T$ and $\tilde{r}=[r_1 r_2^* r_3 r_4^*]^T$. In addition, 'T' denotes transpose calculation and 'H' denotes a channel response matrix. The channel response matrix H is a matrix defined in two dimensions of a space domain (corresponding to column elements) and a time domain (corresponding to row elements). The channel response matrix H can be expressed as $$H = \begin{bmatrix} h_1 & h_2 & h_3 & h_4 \\ h_2^* & -h_1^* & h_4^* & -h_3^* \\ -h_1 & -h_2 & h_3 & h_4 \\ -h_2^* & h_1^* & h_4^* & -h_3^* \end{bmatrix} \tag{13}$$

In addition, the channel response matrix H has a pseudo orthogonal characteristic defined as $$H^+H = \begin{bmatrix} \gamma_1 & 0 & 0 & 0 \\ 0 & \gamma_1 & 0 & 0 \\ 0 & 0 & \gamma_2 & 0 \\ 0 & 0 & 0 & \gamma_2 \end{bmatrix} \tag{14}$$

In Equation (14), $\gamma_1=2(|h_1|^2+|h_2|^2)$ and $\gamma_2=2(|h_{13}|^2+|h_4|^2)$.

Describing Equation (14), as a matched filter has pseudo orthogonality though not full orthogonality, the diagonal matrix shown in Equation (14) appears. Therefore, 4 symbols simultaneously transmitted by an STBC encoder in the transmitter can undergo individual symbol estimation through the foregoing process, e.g., Equation (9), Equation (11) and Equation (14).

Next, a brief description will be made of a transmission/reception process in a system employing the pseudo orthogonal space-time block coding scheme.

A transmitter separates input symbols to an STBC encoder into in-phase components and quadrature-phase components, and then performs space-time coding on the in-phase components and quadrature-phase components. In order to obtain a space-time diversity gain, a rotated signal point should be used. A rotation angle is changeable according to a modulation level. For example, the rotation angel is arctan(2) for 4 QAM, arctan(¼) for 16 QAM, and arctan(⅛) for 64 QAM. The signals transmitted in this manner are subjected to data estimation processing at a receiver after matched-filtering and in-phase/quadrature-phase component reconfiguration.

For example, signals $v_i$, which are the resulting signals of the matched filtering and in-phase/quadrature-phase component reconfiguration process, can be expressed as $$v_0 = \alpha s_{0,I} + j\beta s_{0,Q} + w_{0,I} + jw_{2,Q}$$

$$v_1 = \alpha s_{1,I} + j\beta s_{1,Q} + w_{1,I} + jw_{3,Q}$$

$$v_2 = \beta s_{2,I} + j\alpha s_{2,Q} + w_{2,I} + jw_{0,Q}$$

$$v_3 = \beta s_{3,I} + j\alpha s_{3,Q} + w_{3,I} + jw_{1,Q} \quad (15)$$

In Equation (15), $w_i$ denotes a matched-filtered noise component, and can be written as $$W = [w_0\ w_1\ w_2\ w_3]^T = H^* n \quad (16)$$

The filtered noise components $w_0$ and $w_1$ have a variance value of $\alpha\sigma_n^2 (\sigma_1^2/2)$, and the filtered noise components $w_2$ and $w_3$ have a variance value of $\beta\sigma_n^2 (\sigma_2^2/2)$. In-phase and quadrature-phase components of the noise component can be assumed as independent probability parameters. Therefore, if a maximum likelihood (ML) estimation scheme is used for the signal $v_i$, transmitted symbols are estimated using probability values defined as $$p(v_i | c) = \qquad (17)$$
$$c \in \chi$$

$$\begin{cases} \frac{1}{\pi\sqrt{\sigma_1^2\sigma_2^2}} \exp\left\{-\frac{|v_{i,I} - \alpha c_I|^2}{\sigma_1^2}\right\} \exp\left\{-\frac{|v_{i,Q} - \beta c_Q|^2}{\sigma_2^2}\right\} & i = 0, 1 \\ \frac{1}{\pi\sqrt{\sigma_1^2\sigma_2^2}} \exp\left\{-\frac{|v_{i,I} - \beta c_I|^2}{\sigma_2^2}\right\} \exp\left\{-\frac{|v_{i,Q} - \alpha c_Q|^2}{\sigma_1^2}\right\} & i = 2, 3 \end{cases}$$

where $\chi$ denotes a rotated signal point used in the transmitter.

Linear processing will now be described with reference to Equation (11), by way of example. That is, a description will be made of linear processing in a receiver using $\tilde{r}$ determined by performing complex conjugating on a $2^{nd}$ element and a $4^{th}$ element of the reception signal 'r' as illustrated in Equation (11).

It will be assumed that the receiver previously recognizes the channel response matrix H and the transmitter does not previously recognize the channel response matrix H. A MIMO channel can be disassembled into parallel channels by applying a channel matched filter $H^+$ thereto, and this can be expressed as $$\hat{r} = H^+\tilde{r} = Dx + \tilde{n} \quad (18)$$

In Equation (18), D denotes a diagonal matrix of $D = \text{diag}(\gamma_1, \gamma_2, \gamma_3, \gamma_4)$ and $\tilde{n}$ denotes $H^+\tilde{n}(\hat{n} = H^+\tilde{n})$. That is, because $\tilde{r} = Hx + \tilde{n}$ as shown in Equation (11) and $$H^+H = \begin{bmatrix} \gamma_1 & 0 & 0 & 0 \\ 0 & \gamma_1 & 0 & 0 \\ 0 & 0 & \gamma_2 & 0 \\ 0 & 0 & 0 & \gamma_2 \end{bmatrix}$$

as shown in Equation (14), the diagonal matrix D becomes the same matrix as a diagonal matrix on the right side of Equation (14).

An estimation signal $\hat{x}$ determined by estimating a signal 'x' transmitted by the transmitter can be expressed as $$\hat{x} = D^{-1}\hat{r} = x + D^{-1}\hat{n} \quad (19)$$

In addition, an autocorrelation matrix of the noise component is calculated by $$R_{nn} = E[(D^{-1}\hat{n})(D^{-1}\hat{n})^+] \quad (20)$$
$$= E[D^{-1}H^+\tilde{n}\tilde{n}^+HD^{-1}]$$
$$= D^{-1}$$

Diversity gains for the $(x_1, x_2)$ and $(x_3, x_4)$ are represented by $\gamma_1$ and $\gamma_2$, respectively. Therefore, the pseudo orthogonal space-time block coding scheme has a diversity gain $\gamma_1 = 2 (|h_1|^2 + |h_2|^2)$ or $\gamma_2 = 2(|h_3|^2 + |h_4|^2)$ which is less than a diversity gain $(|h_1|^2 + |h_2|^2 + |h_3|^2 + |h_4|^2)$ of the full diversity scheme. However, the pseudo orthogonal space-time block coding scheme has a full data rate, whereas the full diversity scheme causes a loss in the data rate. Therefore, the present invention makes it possible to acquire a full diversity gain for frequency selective channels by applying a parallel transmit diversity.

The pseudo orthogonal space-time block coding scheme can acquire a full data rate unlike that of the conventional space-time block coding scheme, while acquiring the same diversity gain as that of the conventional space-time block coding scheme like the Alamouti space-time block coding scheme and the Tarokh space-time block coding scheme.

When the Alamouti space-time block coding scheme is used, the full diversity gain and simple decoding are possible. Disadvantageously, however, the Alamouti space-time block coding scheme can be optimally applied only when two transmission antennas are used. That is, the Alamouti space-time block coding scheme cannot simultaneously acquire the full diversity gain and the full data rate when more than 2 transmission antennas are used. When the Alamouti space-time block coding scheme is applied to a MIMO mobile communication system using more than 2 transmission antennas, one of the diversity gain and the data rate is subject to loss.

Therefore, as the pseudo orthogonal space-time block coding scheme aims at acquiring a full data rate, it does not fully satisfy a complex orthogonal code design condition for the Alamouti space-time block coding scheme. However, the pseudo orthogonal space-time block coding scheme can minimize decoding complexity because it can apply a very simple ML decoding algorithm while maintaining orthogonality.

Herein, it will be assumed that a set of all symbol vectors 'x' that the transmitter can transmit is represented by 's'. A size of the set 's' of all the transmittable symbol vectors 'x' is $M^4$, and M represents the number of constellation points. As described with reference to Equation (10), ML detection for all the transmittable symbol vectors 'x' can be achieved by $$\hat{x} = \arg\min_{\hat{x} \in S} \|\tilde{r} - H\hat{x}\|^2 \qquad (21)$$

Using the fact that the channel response matrix H has pseudo orthogonality as described with reference to Equation (14), Equation (21) can be rewritten as $$\begin{aligned}\hat{x} &= \arg\min_{\hat{x} \in S} (\tilde{r} - H\hat{x})^+(\tilde{r} - H\hat{x}) \\ &= \arg\min_{\hat{x} \in S} (\tilde{r} - H\hat{x})^+(H^+H)(\tilde{r} - H\hat{x}) \\ &= \arg\min_{\hat{x} \in S} \|H^+(\tilde{r} - H\hat{x})\|^2 \\ &= \arg\min_{\hat{x} \in S} \|H^+\tilde{r} - D\hat{x}\|^2 \end{aligned} \qquad (22)$$

As described above, the ML decoding scheme in Equation (21) is changed to the simple calculation expression of Equation (22).

Next, assuming that an $i^{th}$ column vector of the channel response matrix H is denoted by $h_i$, a decision matrix for detection of the $x_1$ or $x_2$ can be expressed as Equation (23) from Equation (22).

$$|h_i^+\tilde{r} - \gamma_1 x_i|^2 \qquad (23)$$

In addition, a decision matrix for detection of the $x_3$ and $x_4$ can be expressed as Equation (24) from Equation (22).

$$|h_j^+\tilde{r} - \gamma_2 x_j|^2 \qquad (24)$$

It can be appreciated from the foregoing description that when the pseudo orthogonal space-time block coding scheme is used, a decoding process in the receiver can be simply implemented even though a plurality of transmission antennas, i.e. more than 2 transmission antennas, are used.

Now, a description will be made of performance of the pseudo orthogonal space-time block coding scheme.

A design criterion for space-time codes can be expressed through a codeword difference matrix $C_{ce}$. The codeword difference matrix is $C_{ce} = C_c - C_e$, where $C_c$ denotes a transmission code matrix and $C_e$ denotes a detection matrix generated by estimating the transmission code matrix $C_c$. Herein, the codeword will be defined as 'c' and a codeword representing the codeword in which an error occurs will be defined as 'e'. Then, a probability that the transmitted codeword $c=(c_1(1), \ldots, c_1(l), \ldots, c_n(1), \ldots, c_l(1))$ will be detected as the erroneous codeword $e=(e_1(1), \ldots, e_n(1), \ldots, e_1(l), \ldots, e_n(l))$ can be expressed as $$P(c \to e \mid h_{ij}, i=1,2,\ldots,n, j=1,2,\ldots,m) \leq \qquad (25)$$

$$\exp\left(-\left(\frac{E_s}{4N_0}\right)\sum_{j=1}^{m}\sum_{k=1}^{l}\left|\sum_{i=1}^{n}h_{ij}(c_i(k) - e_i(k))\right|^2\right)$$

In Equation (25), $P(c \to e \mid h_{ij}, i=1,2,\ldots,n, j=1,2,\ldots,m)$ represents the probability that the transmitted codeword $c=(c_1(1),\ldots,c_1(l),\ldots,c_n(1),\ldots,c_l(1))$ will be detected as the erroneous codeword $e=(e_1(1),\ldots,e_n(1),\ldots,e_1(l),\ldots,e_n(l))$. Herein, 'n' denotes the number of transmission antennas, 'm' denotes the number of reception antennas, and l denotes the number of packets. Assuming that a channel environment between the transmitter and the receiver is a Rayleigh fading channel environment, a probability $P(c \to e \mid h_{ij}, i=1,2,\ldots,n, j=1,2,\ldots,m)$ that the transmitted codeword $c=(c_1(1),\ldots,c_1(l),\ldots,c_n(1),\ldots,c_l(1))$ will be detected as the erroneous codeword $e=(e_1(1),\ldots,e_n(1),\ldots,e_1(l),\ldots,e_n(l))$ can be expressed as $$P(c \to e) \leq \left(\prod_{i=1}^{r}\lambda_i\right)^{-m}\left(\frac{E_s}{4N_0}\right)^{-rm} \qquad (26)$$

In Equation (26), 'r' denotes a rank of a matrix $A = C_{ce}^+ C_{ce}$, and $\lambda_i$ denotes a nonzero eigenvalue of the matrix A. From this, a diversity gain rm and a coding gain $(\lambda_1\lambda_2\ldots\lambda_r)^{1/r}$ are acquired. The matrix $C_{ce}$ has the same characteristic as the matrix A in terms of 'r', and a study of the matrix $C_{ce}$ is being steadily made to minimize a pairwise error probability (PEP) that determines performance in signal-to-noise ratio (SNR).

Now, a comparison between complex orthogonal designs will be made for the case where 4 transmission antennas are used.

Assuming that a pseudo orthogonal design is represented by P and an orthogonal design is represented by O, a diversity order can be expressed as $$\min_{c \neq e} \text{rank}[p_{ce}^+ p_{ce}] = \qquad (27)$$

$$\min_{c \neq e} \text{rank}\left[\sum_{k=1}^{2} 2|x_{ck} - x_{ek}|^2 \begin{bmatrix} I_2 & 0 \\ 0 & 0 \end{bmatrix} + \sum_{k=3}^{4} 2|x_{ck} - x_{ek}|^2 \begin{bmatrix} 0 & 0 \\ 0 & I_2 \end{bmatrix}\right] = 2$$

In addition, a diversity order obtained by rotating $(P_r)$ the pseudo orthogonal design P can be expressed as Equation (28). That is, the $P_r$ and P are expressions of the values obtained by rotating and shuffling a signal, which is an element of a matrix, and these can be expressed as Rotation $x'_{ck} = x_{ck}\exp(j\theta)$, shuffling
$$\tilde{x}_{ck} = Re\{x'_{ck}\} + Im\{x'_{c(k+2)\bmod 4}\} \qquad (28)$$

In conclusion, an original QAM signal 'x', its rotated signal x', and a value $\hat{x}$ determined after shuffling these signals, are acquired from Equation (28).

$$\min_{c \neq e} \text{rank}[p_r^+ p_r] = \min_{c \neq e} \text{rank}\left[\sum_{k=1}^{2} 2(x'_{ck,I} - x'_{ek,I})^2 \begin{bmatrix} I_2 & 0 \\ 0 & 0 \end{bmatrix} + \right. \qquad (29)$$

$$\left.\sum_{k=3}^{4} 2(x'_{ck,Q} - x'_{ek,Q})^2 \begin{bmatrix} 0 & 0 \\ 0 & I_2 \end{bmatrix}\right] = 4$$

In Equation (29), 'r' denotes a rotation concept, and $x'_{ck} = x'_{ck,I} + jx'_{ck,Q}$. That is, the $P_r$ makes it possible to obtain up to a full diversity gain through the shuffling and rotation technique for signals in a concept of the scheme of P. That is, Equation (29) represents a process of individually shuffling a real part and an imaginary part of each signal according to a predetermined rule in the P, and then rotating the signal itself by the optimal angle. Through this process, it is possible to satisfy up to the full diversity gain, which is not satisfied in the P.

It is noted that a diversity order of the pseudo orthogonal design P is 2 as shown in Equation (27), a diversity order of the $P_r$ determined by rotating the P is 4 as shown in Equation (29), and a diversity order of the orthogonal design O is 4. The orthogonal design O is generally a basic concept for all space-time block coding schemes, and a description thereof will be omitted herein.

Also, it can be understood that a multiple, 2, of the diagonal matrix brings a coding gain in terms of a decision criterion for the pseudo orthogonal codes. Evaluations of the decision criterion for the pseudo orthogonal design P and the orthogonal design O can be expressed as Equation (30) and Equation (31), respectively. In addition, an evaluation of the decision criterion for the pseudo orthogonal design $P_r$ can be expressed as Equation (32).

$$\min_{c \ne e} \det[O_{ce}^+ O_{ce}] = \min_{c \ne e} \left[ \sum_{k=1}^{2} |x_{ck} - x_{ek}|^2 \right]^4 \quad (30)$$
$$= |x_{ck} - x_{ek}|^8 \text{ for } k = 1, \ldots, 4$$

$$\min_{c \ne e} \det[p_{ce}^+ p_{ce}] = \min_{c \ne e} 4 \left[ \sum_{k=1}^{2} |x_{ck} - x_{ek}|^2 \right]^2 \otimes \quad (31)$$
$$\left[ \sum_{k=3}^{4} |x_{ck} - x_{ek}|^2 \right]^2$$
$$= 4|x_{ck} - x_{ek}|^4 \text{ for } k = 1, \ldots, 4$$

$$\min_{c \ne e} \det[p_r^+ p_r] = \min_{c \ne e} 16 \left[ \sum_{k=1}^{2} (x'_{ck,I} - x'_{ek,I})^2 \right]^2 \otimes \quad (32)$$
$$\left[ \sum_{k=1}^{2} (x'_{ck,Q} - x'_{ek,Q})^2 \right]^2$$
$$= 16(x'_{ck,I} - x'_{ek,I})^4 (x'_{ck,Q} - x'_{ek,Q})^4$$
$$\text{for } k = 1, \ldots, 4$$

In Equation (31) and Equation (32), $\otimes$ denotes multiplication between nonzero values.

A minimum value of the $(\det[C_{ce}^+ C_{ce}])^{1/r}$ determines the coding gain described with reference to Equation (26). Therefore, a coding gain of the pseudo orthogonal design P is $2|x_{ck} - x_{ek}|^2$ and a coding gain of the $P_r$ is $2(x'_{ck,I} - x'_{ek,I})(x'_{ck,Q} - x'_{ek,Q})$, whereas a coding gain of the orthogonal design O becomes $|x_{ck} - x_{ek}|^2$. The reason why it is defined such that $(x'_{ck,I} - x'_{ek,I})(x'_{ck,Q} - x'_{ek,Q}) \ne 0$, $k=1, \ldots, 4$ and the definition is effected is because there is no overlapping coordinates between signals as the signals were rotated. Herein, it is defined that $MPD(x'_{ck}, x'_{ek}) = (x'_{ck,I} - x'_{ek,I})(x'_{ck,Q} - x_{ek,Q})$, $k=1, \ldots, 4$, and the signals should be rotated to an angel at which the minimum product distance (MPD) is maximized at a given signal set.

As described above, the pseudo orthogonal design P and the $P_r$ have a coding gain of about 3 [dB] as compared with the orthogonal design O.

Returning now to FIG. 2, the channel estimator 202 channel-estimates a signal received via the reception antenna 200, and outputs the channel estimation result to the detector 204. The detector 204 generates hypothesis symbols for the signal output from the channel estimator 202, calculates a decision statistic for all symbols transmittable from the transmitter using the hypothesis symbols, detects modulation symbols transmitted by the transmitter through threshold detection, and outputs the detected modulation symbols to the P/S converter 206.

The P/S converter 206 converts the parallel modulation symbols output from the detector 204 into serial modulation symbols, and outputs the serial modulation symbols to the demodulator 208. The demodulator 208 demodulates the serial modulation symbols output from the P/S converter 206 into the original serial modulation symbols using a demodulation scheme corresponding to the modulation scheme used in the modulator 100 of the transmitter.

A comparison between the pseudo orthogonal space-time block coding scheme and the conventional space-time block coding scheme in terms of the channel capacity will now be made.

In comparing the channel capacity, it will be assumed that the total transmission power determined according to the number of transmission antennas is set to a constant. In addition, if it is assumed that the components of all of the symbol vectors 'x' transmittable from the transmitter are independently and uniformly distributed, the following relationship is given.

$$E|xx^+| = \frac{\rho}{N} I_N \quad (33)$$

In Equation (33), $\rho$ denotes an SNR at the receiver, and $I_N$ denotes an identity matrix with an order N.

In addition, the capacity of a MIMO mobile communication system with N transmission antennas can be expressed as $$C_N = \log_2 \left( 1 + \frac{\rho}{N} \sum_{i=1}^{N} |h_i|^2 \right) b/s/Hz \quad (34)$$

In Equation (34), $C_N$ denotes a channel capacity, and the channel capacity $C_N$ approaches a Gaussian capacity of $\log_2(1+\rho)$ as the number N of transmission antennas increases higher. It is well known that a random variable $$\frac{1}{N} \sum_{i=1}^{N} |h_1|^2$$

almost approaches 1, if N becomes less than 4. These characteristics make it possible to perceive a tradeoff between the full data rate and the full diversity gain.

When the number N of the transmission antennas is N=2, the Alamouti space-time block coding scheme can acquire an open-loop channel capacity shown in Equation (14) using Equation (35) below.

$$C_{Al} = \log_2 \left( 1 + \frac{\rho |h_1|^2 + |h_2|^2}{2} \right) \quad (35)$$

In Equation (35), $C_{Al}$ denotes a channel capacity that can be acquired through the Alamouti space-time block coding scheme.

When the MIMO channel model described with reference to Equation (18) is applied, the channel capacity that can be acquired through the pseudo orthogonal space-time block coding scheme is determined by $$C_{PO} = \frac{1}{4}\log_2\det\left(1 + \frac{\rho}{4}D\right) \qquad (36)$$

In Equation (36), $C_{PO}$ denotes a channel capacity that can be acquired through the pseudo orthogonal space-time block coding scheme, and D denotes a diagonal matrix. Since D in Equation (36) represents a diagonal matrix, Equation (36) can be rewritten as $$C_{PO} = \frac{1}{2}\log_2\left(1 + \frac{\rho|h_1|^2 + |h_2|^2}{2}\right) + \frac{1}{2}\log_2\left(1 + \frac{\rho|h_3|^2 + |h_4|^2}{2}\right) \qquad (37)$$

Now, a description will be made of an outage channel capacity that can affect the MIMO mobile communication system.

An outage channel capacity $C_\epsilon^{out}$ (b) at a data rate 'b' can be expressed as $$C_\epsilon^{out}(b) = [b: \max b \text{ such that } P(b) \leq \epsilon] \qquad (38)$$

where P(b) denotes a probability that the data rate 'b' will not be supported.

The outage channel capacity is calculated by a Monte-Carlo simulation, and is additionally considered for the performance characteristics of other designs. The "Monte-Carlo simulation" refers to a method of generating random numbers by regarding an input variable as a probability function, accepting only appropriate values and discarding the other values, thereby to obtain the most approximate result value.

Figure 3:
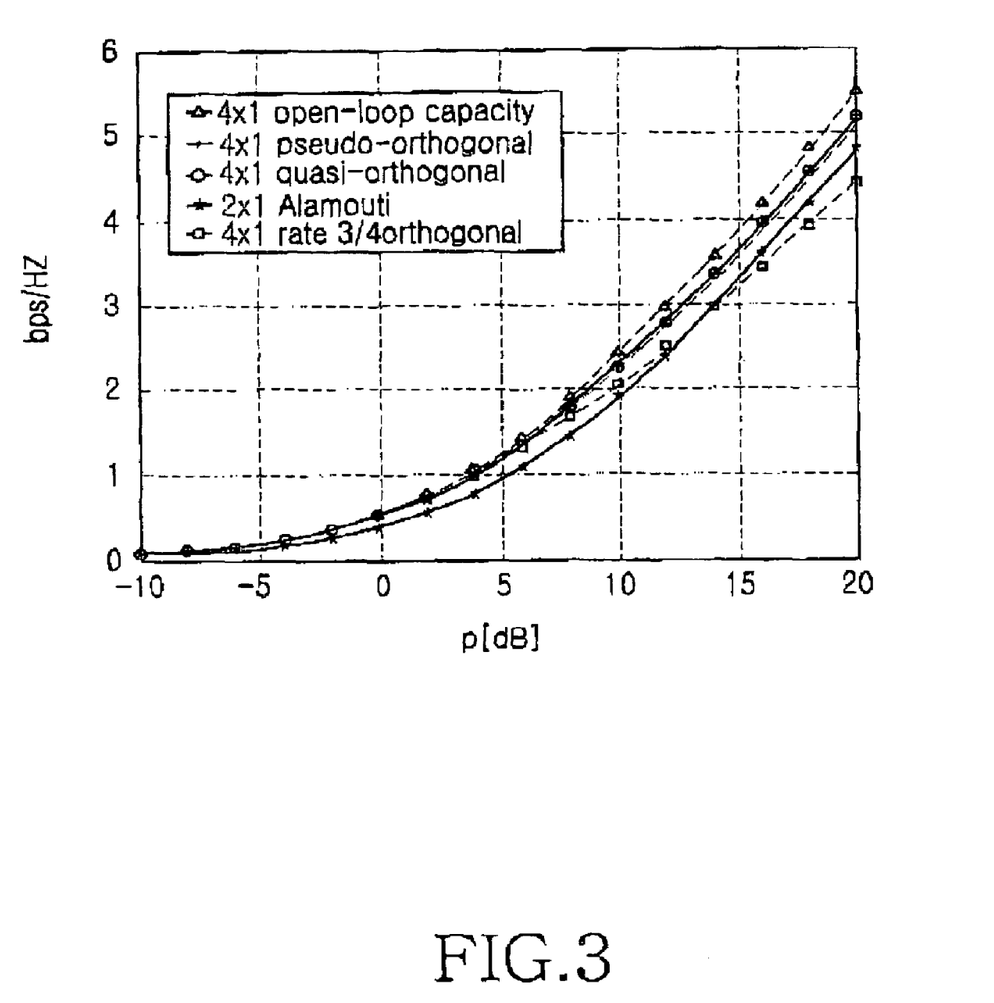
FIG. 3 is a graph illustrating 10% outage channel capacity of the novel pseudo orthogonal space-time block coding scheme and the conventional space-time block coding scheme.

FIG. 3 is a graph illustrating 10% outage channel capacity of the novel pseudo orthogonal space-time block coding scheme and the conventional space-time block coding scheme. Referring to FIG. 3, a horizontal axis represents an SNR [dB] and a vertical axis represents a data rate [bps/Hz]. FIG. 3 illustrates channel capacity not only for the pseudo orthogonal code and the orthogonal code but also for a case where 4 transmission antennas are used and another other case where 2 transmission antennas are used. In conclusion, the pseudo orthogonal space-time block coding scheme can acquire a full diversity gain and a full data rate while minimizing the decoding complexity in a MIMO mobile communication system employing 4 transmission antennas.

Figure 4:
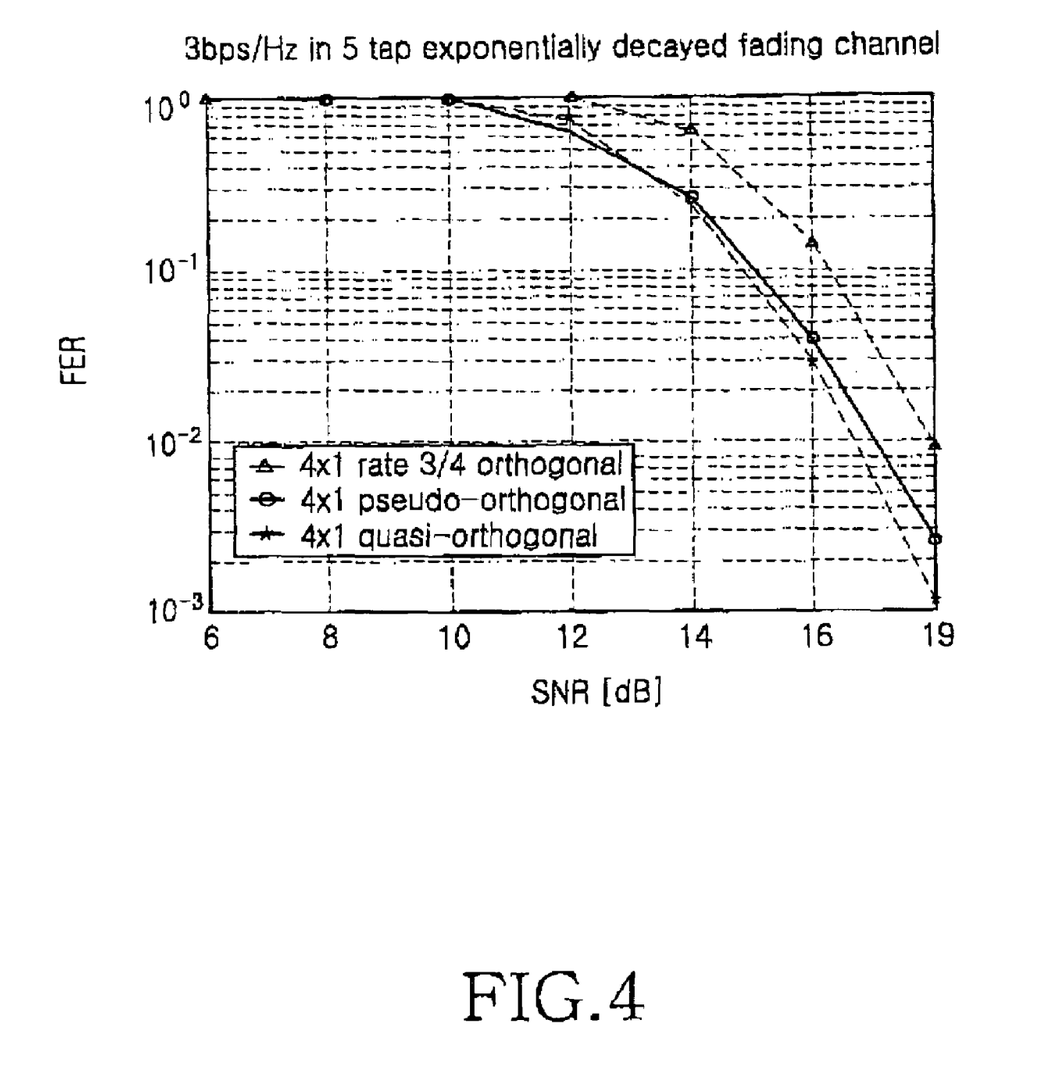
FIG. 4 is a graph illustrating performances of the novel pseudo orthogonal space-time block coding scheme and the conventional space-time block coding scheme in a 3 bps/Hz-channel environment and a 4×1 MIMO mobile communication system.
Figure 5:
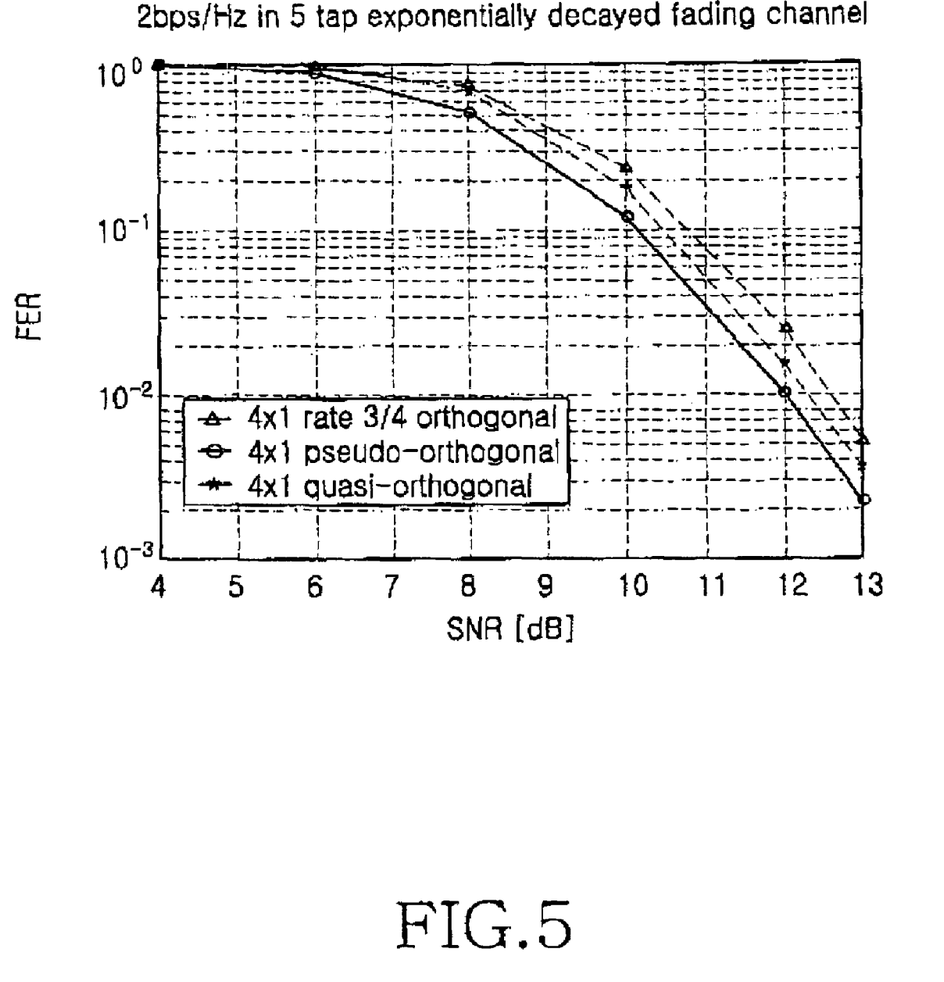
FIG. 5 is a graph illustrating performances of the novel pseudo orthogonal space-time block coding scheme and the conventional space-time block coding scheme in a 2 bps/Hz-channel environment and a 4×1 MIMO mobile communication system.

Next, performance of the pseudo orthogonal space-time block coding scheme will be described with reference to FIGS. 4 and 5. FIG. 4 is a graph illustrating performances of the novel pseudo orthogonal space-time block coding scheme and the conventional space-time block coding scheme in a 3 bps/Hz-channel environment and a 4×1 MIMO mobile communication system. FIG. 5 is a graph illustrating performances of the novel pseudo orthogonal space-time block coding scheme and the conventional space-time block coding scheme in a 2 bps/Hz-channel environment and a 4×1 MIMO mobile communication system.

Before a description of FIGS. 4 and 5, it should be noted that performance curves for the pseudo orthogonal space-time block coding scheme and the conventional space-time block coding scheme, illustrated in FIGS. 4 and 5, were acquired under the assumption of the system parameters shown in Table 1 below.

TABLE 1

|  | $R_T$ = 3 bps/Hz | $R_T$ = 2 bps/Hz |
|---|---|---|
| Rate 3/4 Orthogonal | 64 QAM | 16 QAM |
|  | $R_c$ = 2/3 | $R_c$ = 2/3 |
| Quasi-orthogonal | 16 QAM | 16 QAM |
|  | $R_c$ = 3/4 | $R_c$ = 1/2 |
| Pseudo-orthogonal | 16 QAM | 16 QAM |
|  | $R_c$ = 3/4 | $R_c$ = 1/2 |

As shown in Table 1, it is assumed that in the Monte-Carlo simulation, a binary convolutional code polynomial (133, 171) in octal is used, 2 bps/Hz and 3 bps/Hz-channel environments are used, each channel has an independent Rayleigh fading channel, and only an indoor channel model with a 5-tap power delay profile having an exponentially decayed fading characteristic is used. Further, it is assumed that 64-point fast Fourier transform (FFT) is used for Orthogonal Frequency Division Multiplexing (OFDM) modulation as defined in an Institute of Electrical and Electronics Engineers (IEEE) 802.11a communication system standard. In addition, a one-OFDM symbol period has a length of 4[μs], including a guard interval of 0.8[μs]. Lengths of the guard interval and the OFDM symbol period are determined such that root mean square (RMS) delay spread of up to 25[ns] can be processed.

A 5-tap multipath channel used in the Monte-Carlo simulation has RMS delay spread of about 100[ns]. In addition, it is assumed that one frame is comprised of 4 OFDM symbols. It is well known that rotation in a constellation achieves an improved performance of the pseudo orthogonal code and optimal rotation in the constellation is used for the pseudo orthogonal code. Further, it is assumed that a coding matrix like a square-matrix embedded space time block code is used for a ¾-data rate orthogonal code.

Referring to FIG. 4, a horizontal axis represents an NSR [dB] and a vertical axis represents a frame error rate (FER). As illustrated in FIG. 4, the pseudo orthogonal space-time block coding scheme has a gain of about 1[dB] as compared with the other space-time block coding schemes, and exhibits its best performance at 1% FER.

In terms of complexity of a receiver, the pseudo orthogonal space-time block coding scheme can perform decoding with a much simpler decoder structure as compared with the quasi-orthogonal code having a relatively complex decoder structure.

In addition, the performance curves shown in FIG. 4 do not show an abrupt change in slope, because both the pseudo orthogonal space-time block coding scheme and the conventional space-time block coding scheme can prevent performance deterioration in the frequency selective fading channel due to a diversity gain obtained by using the OFDM scheme. The performance acquired with the use of the OFDM scheme can be further improved by applying channel coding with a relatively low coding rate and additional frequency diversity. In particular, the frequency diversity can compensate for the space transmit diversity of the pseudo orthogonal space-time block coding scheme.

Referring to FIG. 5, performance curves at a coding rate lower than that in FIG. 4, i.e. 2[bps/Hz], are shown.

Figure 6:
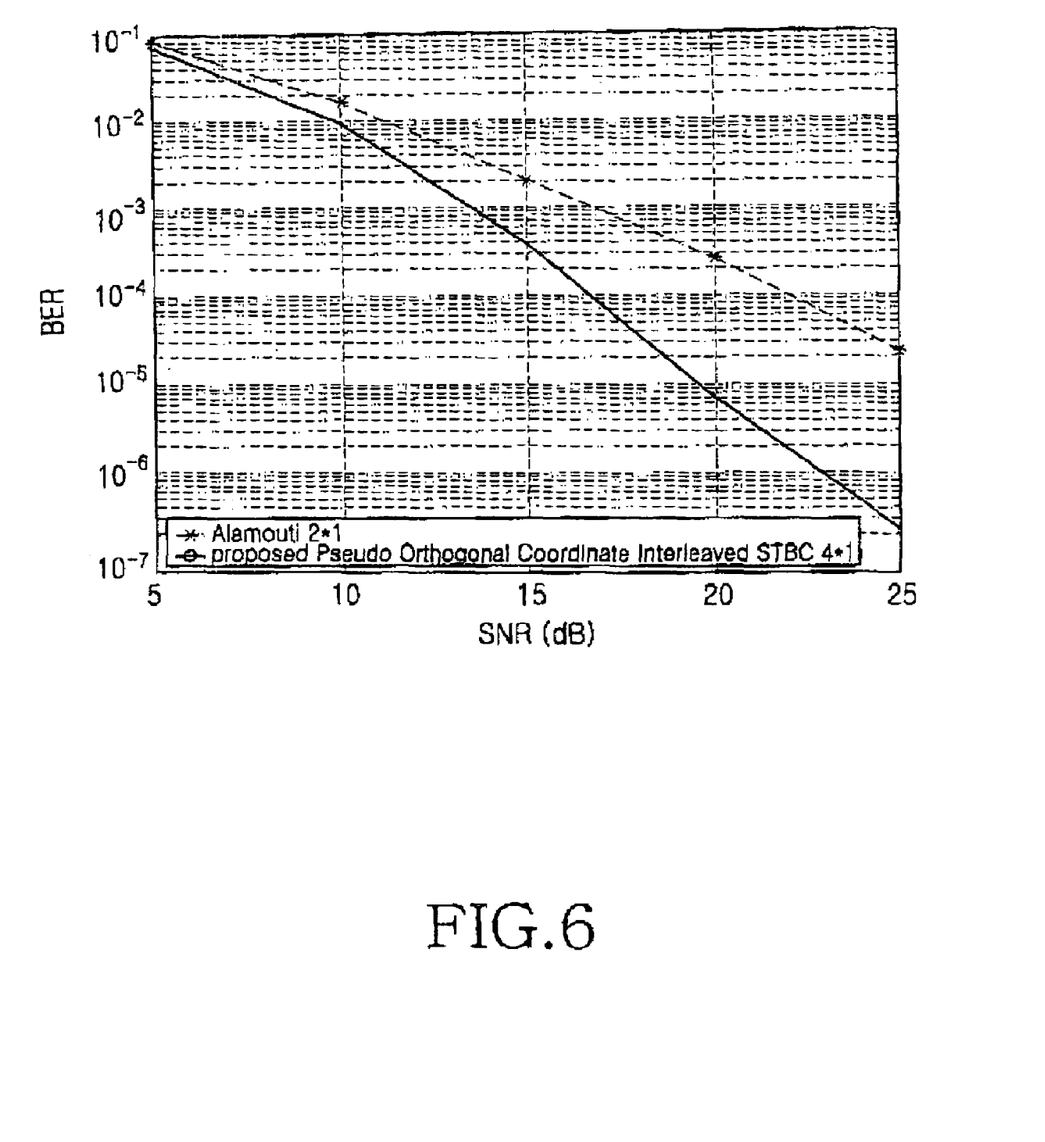
FIG. 6 is a graph illustrating performances of the novel pseudo orthogonal space-time block coding scheme and the Alamouti space-time block coding scheme in a 4×1 MIMO mobile communication system to which 4 QAM modulation and a quasi-static flat fading channel environment are applied.

FIG. 6 is a graph illustrating performances of the novel pseudo orthogonal space-time block coding scheme and the Alamouti space-time block coding scheme in a 4×1 MIMO mobile communication system to which 4 QAM modulation and a quasi-static flat fading channel environment are applied. Referring to FIG. 6, a horizontal axis represents an SNR [dB] and a vertical axis represents a bit error rate (BER). It can be understood from FIG. 6 that the proposed pseudo orthogonal space-time block coding scheme is superior in BER performance to the conventional space-time block coding scheme, for example, the Alamouti space-time block coding scheme.

As can be understood from the foregoing description, the newly proposed pseudo orthogonal space-time block coding scheme can maximize a data rate and a coding gain while maintaining a full diversity gain in a MIMO mobile communication system. In addition, the pseudo orthogonal space-time block coding scheme contributes to minimization of calculations and complexity of a receiver.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for coding a pseudo orthogonal space-time block code in a transmitter using 4 transmission antennas, the method comprising the steps of:

upon receiving information symbol streams $x_1 x_2 x_3 x_4$ to be transmitted, parallel-converting the received information symbol streams $x_1 x_2 x_3 x_4$ into $x_1, x_2, x_3, x_4$; and coding the parallel-converted information symbol streams $x_1, x_2, x_3, x_4$ using a pseudo orthogonal space-time block coding scheme such that the information symbol streams $x_1, x_2, x_3, x_4$ are transmitted via corresponding transmission antennas for first to fourth time periods, comprising the steps of:

coding the information symbol streams $x_1, x_2, x_3, x_4$ in the first time period such that $x_1$ is transmitted via a first transmission antenna, $x_2$ is transmitted via a second transmission antenna, $x_3$ is transmitted via a third transmission antenna and $x_4$ is transmitted via a fourth transmission antenna;

coding the information symbol streams $x_1, x_2, x_3, x_4$ in the second time period such that $-x_2^*$ is transmitted via the first transmission antenna, $-x_1^*$ is transmitted via the second transmission antenna, $-x_4^*$ is transmitted via the third transmission antenna and $-x_3^*$ is transmitted via the fourth transmission antenna;

coding the information symbol streams $x_1, x_2, x_3, x_4$ in the third time period such that $-x_1$ is transmitted via the first transmission antenna, $-x_2$ is transmitted via the second transmission antenna, $x_3$ is transmitted via the third transmission antenna and $x_4$ is transmitted via the fourth transmission antenna; and coding the information symbol streams $x_1, x_2, x_3, x_4$ in the fourth time period such that $x_2^*$ is transmitted via the first transmission antenna, $-x_1^*$ is transmitted via the second transmission antenna, $-x_4^*$ is transmitted via the third transmission antenna and $x_3^*$ is transmitted via the fourth transmission antenna, where * denotes complex conjugate calculation.

2. An apparatus for coding a pseudo orthogonal space-time block code in a transmitter using 4 transmission antennas, the apparatus comprising:

a serial-to-parallel converter for, upon receiving information symbol streams $x_1 x_2 x_3 x_4$ to be transmitted, parallel-converting the received information symbol streams $x_1 x_2 x_3 x_4$ into $x_1, x_2, x_3, x_4$; and a pseudo orthogonal space-time block coding (PO-STBC) encoder for coding the parallel-converted information symbol streams $x_1, x_2, x_3, x_4$ using a pseudo orthogonal space-time block coding scheme such tat the information symbol streams $x_1, x_2, x_3, x_4$ are transmitted via corresponding transmission antennas for first to fourth time periods, wherein the PO-STBC encoder performs coding the information symbol streams $x_1, x_2, x_3, x_4$ in the first time period such that $x_1$ is transmitted via a first transmission antenna, $x_2$ is transmitted via a second transmission antenna, $x_3$ is transmitted via a third transmission antenna and $x_4$ is transmitted via a fourth transmission antenna, coding the information symbol streams $x_1, x_2, x_3, x_4$ in the second time period such that $-x_2^*$ is transmitted via the first transmission antenna, $x_1^*$ is transmitted via the second transmission antenna, $-x_2^*$ is transmitted via the third transmission antenna and $x_3^*$ is transmitted via the fourth transmission antenna, coding the information symbol streams $x_1, x_2, x_3, x_4$ in the third time period such that $-x_1$ is transmitted via the first transmission antenna, $-x_2$ is transmitted via the second transmission antenna, $x_3$ is transmitted via the third transmission antenna and $x_4$ is transmitted via the fourth transmission antenna, and coding the information symbol streams $x_1, x_2, x_3, x_4$ in the fourth time period such that $x_2^*$ is transmitted via the first transmission antenna, $-x_1^*$ is transmitted via the second transmission antenna, $-x_4^*$ is transmitted via the third transmission antenna and $x_3^*$ is transmitted via the fourth transmission antenna;

where * denotes complex conjugate calculation.

3. A method for decoding in a receiver a pseudo orthogonal space-time block code that a transmitter transmits via a plurality of transmission antennas, the method comprising the steps of:

upon receiving a signal, generating a channel response matrix by channel-estimating the received signal; and decoding the pseudo orthogonal space-time block code transmitted from the transmitter into information symbol streams based on the channel response matrix, wherein the channel response matrix is defined as $$H = \begin{bmatrix} h_1 & h_2 & h_3 & h_4 \\ h_2^* & -h_1^* & h_4^* & -h_3^* \\ -h_1 & -h_2 & h_3 & h_4 \\ -h_2^* & h_1^* & h_4^* & -h_3^* \end{bmatrix}$$

where $h_1$ denotes a path gain of a path that a signal transmitted via first transmission antenna experiences, $h_2$ denotes a path gain of a path that a signal transmitted via second transmission antenna experiences, $h_3$ denotes a path gain of a path that a signal transmitted via third transmission antenna experiences, and $h_4$ denotes a path gain of a path that a signal transmitted via fourth transmission antenna experiences where * denotes complex conjugate calculation.

4. The method of claim 3, wherein the decoding step comprises the step of multiplying the received signal by the channel response matrix, and estimating each of elements of the signal multiplied by the channel response matrix as each of the information symbol streams.

5. An apparatus for decoding in a receiver a pseudo orthogonal space-time block code that a transmitter transmits via a plurality of transmission antennas, the apparatus comprising:

a channel estimator for, upon receiving a signal, generating a channel response matrix by channel-estimating the received signal; and a detector for decoding the pseudo orthogonal space-time block code transmitted from the transmitter into information symbol streams depending on the channel response matrix, wherein the transmission antennas include 4 transmission antennas of first to fourth transmission antennas, and the channel response matrix is defined as $$H = \begin{bmatrix} h_1 & h_2 & h_3 & h_4 \\ h_2^* & -h_1^* & h_4^* & -h_3^* \\ -h_1 & -h_2 & h_3 & h_4 \\ -h_2^* & h_1^* & h_4^* & -h_3^* \end{bmatrix}$$

where $h_1$ denotes a path gain of a path that a signal transmitted via the first transmission antenna experiences, $h_2$ denotes a path gain of a path that a signal transmitted via the second transmission antenna experiences, $h_3$ denotes a path gain of a path that a signal transmitted via the third transmission antenna experiences, and $h_4$ denotes a path gain of a path that a signal transmitted via the fourth transmission antenna experiences where * denotes complex conjugate calculation.

6. The apparatus of claim 5, wherein the detector multiplies the received signal by the channel response matrix, and estimates each of elements of the signal multiplied by the channel response matrix as each of the information symbol streams.

* * * * *